United States Patent [19]

Marks

[11] Patent Number: 4,569,552

[45] Date of Patent: Feb. 11, 1986

[54] VISOR MOUNTING ASSEMBLY

[75] Inventor: Larry Marks, St. Joseph, Mich.

[73] Assignee: Prince Corporation, Holland, Mich.

[21] Appl. No.: 658,296

[22] Filed: Oct. 4, 1984

[51] Int. Cl.⁴ .............................................. B60J 3/02
[52] U.S. Cl. .................. 296/97 K; 248/289.1
[58] Field of Search .................. 296/97 K, 97 R; 248/288.3, 289.1

[56] References Cited

U.S. PATENT DOCUMENTS

| | | | |
|---|---|---|---|
| 2,110,120 | 3/1938 | Ball | 296/97 |
| 2,357,974 | 9/1944 | Roberts | 248/289 |
| 2,939,741 | 6/1960 | Keating et al. | 296/97 K |
| 3,017,217 | 1/1962 | Keating | 296/97 K |
| 3,150,896 | 9/1964 | Plattner | 296/97 |
| 3,334,854 | 8/1967 | Nesbitt | 248/289.1 |
| 3,399,923 | 9/1968 | Bornefeld et al. | 296/97 |
| 3,477,678 | 11/1969 | Icke et al. | 248/288.3 |
| 3,767,256 | 10/1973 | Sarkees | 296/97 K |
| 3,954,311 | 5/1976 | Pike | 308/25 |
| 4,023,856 | 5/1977 | DeRees | 296/97 |
| 4,148,519 | 4/1979 | Hollar, Jr. | 296/97 H |
| 4,178,035 | 12/1979 | Cziptschirsch | 296/97 K |
| 4,352,518 | 10/1982 | Prince et al. | 296/97 H |
| 4,377,020 | 3/1983 | Vigo | 296/97 K |

FOREIGN PATENT DOCUMENTS

| | | |
|---|---|---|
| 1965143 | 7/1970 | Fed. Rep. of Germany . |
| 2341940 | 3/1973 | Fed. Rep. of Germany . |
| 7415154 | 4/1974 | Fed. Rep. of Germany . |
| 7531982 | 10/1975 | Fed. Rep. of Germany . |
| 1251469 | 10/1971 | United Kingdom . |

Primary Examiner—Robert R. Song
Attorney, Agent, or Firm—Price, Heneveld, Huizenga & Cooper

[57] ABSTRACT

A torque fitting is molded onto a visor rod end which has a support flange which engages one side of a mounting plate and includes at least one locking tab spaced axially from the flange. A locking clip fits over the torque fitting from an end opposite the flange and includes a locking dog which engages the locking tab on the molded-on torque fitting. The clip includes axially spaced pairs of locking legs having corners which wedge against a surface of the mounting plate opposite the torque fitting flange to provide a tensile force between the locking tab on the torque fitting and the flange to securely hold the torque fitting in position.

21 Claims, 7 Drawing Figures

VISOR MOUNTING ASSEMBLY

BACKGROUND OF THE INVENTION

The present invention relates to automotive visors and particularly to a mounting assembly for attaching the visor to the vehicle.

Conventionally, visors are mounted to a vehicle by an elbow bracket which is secured to the sheet metal framework of the vehicle roof by fastening screws. There exist several types of snap-in visor mounts as well including those of the type shown in U.S. Pat. Nos. 2,357,974; 4,178,035 and in German Patentschrift No. 23 41 940. Also known are the visor mounts disclosed in U.S. patent applications, Ser. No. 341,284, filed Jan. 21, 1982, entitled MOUNTING BRACKET; Ser. No. 515,214, filed July 20, 1983, entitled VISOR PIVOT MOUNT; and Ser. No. 579,084, filed Feb. 10, 1984, entitled VISOR MOUNTING BRACKET which are assigned to the present Assignee.

Although snap-in-type mounting systems are preferable in that they avoid the manual assembly required including the installation of a plurality of fastening screws, the systems shown in the prior art are believed to either be excessively complex and therefore costly, and the visors are either too easily removed thus not providing a secure installation, or too difficult to remove if necessary for replacement or repair.

SUMMARY OF THE PRESENT INVENTION

Thus, it is an object of the present invention to provide an inexpensive, improved, snap-in-type visor mounting system which securely mounts a visor to the headliner area of a vehicle and yet one which can be relatively easily removed if necessary for servicing or replacement. This objective is achieved in the system of the preferred embodiment of the invention by providing a molded-on torque fitting to the visor rod end which has a support flange which engages one side of a mounting plate and at least one locking tab spaced axially from the flange. A locking clip is provided and fits over the torque fitting from an end opposite the flange and includes a locking dog which engages the locking tab on the molded-on torque fitting. The clip includes axially spaced pairs of locking legs having corners which wedge against a surface of the mounting plate opposite the torque fitting flange to provide a tensile force between the locking tab on the torque fitting and the flange to securely hold the torque fitting in position. The locking clip includes deflectable legs which can be bent to permit the clip and torque fitting to be easily removed from the vehicle.

In the preferred embodiment of the invention, the molded-on torque fitting includes a pair of opposed locking tabs near one end, and the flange is positioned at an opposite end with opposed longitudinal ribs extending axially intermediate the locking tabs. In a preferred embodiment, also, the locking clip is a generally U-shaped member made of spring steel and including a pair of dogs which engage the locking tabs on the torque fitting. Mounting tabs extend from ends of the U-shaped locking clip to project below the sheet metal mounting plate of the vehicle roof frame for compressing the legs of the U-shaped member for installation and removal of the clip and torque member carrying the visor rod and visor thereon.

Such a system, with the wedging action provided by the locking clip, provides a secure mounting structure which is easily installed and removed. The system is relatively inexpensive as it requires only a molded-on, plastic torque device and a stamped metal clip. These and other features, objects and advantages of the present invention will become apparent upon reading the following description thereof together with reference to the accompanying drawings in which:

DETAILED DESCRIPTION OF THE PREFERRED EMBODIMENT

Figure 1:
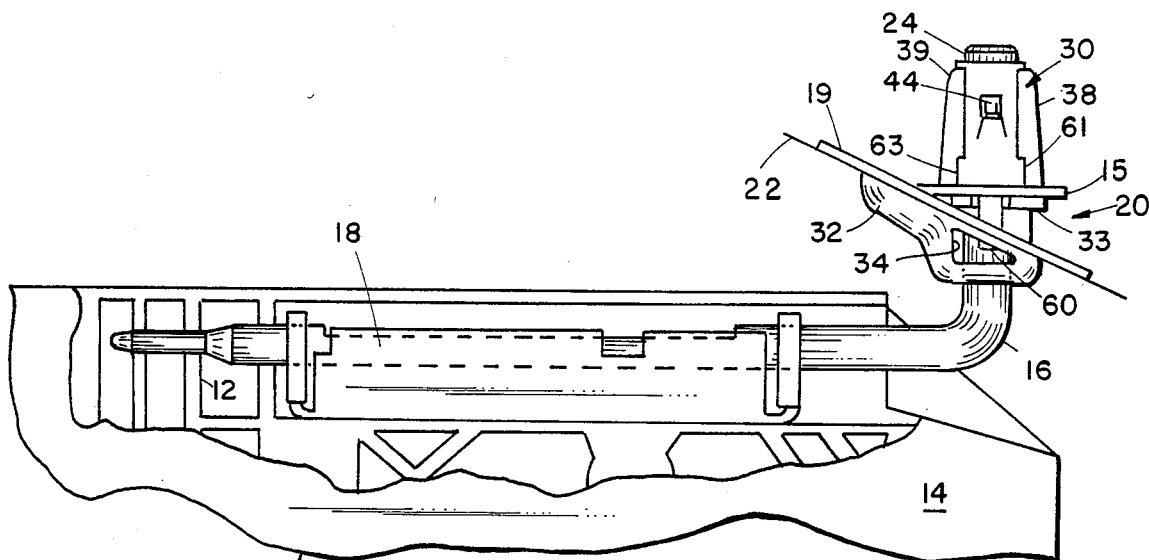
FIG. 1 is a fragmentary, front elevational view, partly broken away, of a visor including the mounting assembly of the present invention.

Referring initially to FIG. 1, there is shown a visor 10 embodying the present invention. The visor includes a molded polypropylene visor core 12 covered by a suitable upholstery fabric 14 conforming the visor to the upholstery material of the vehicle in which it is installed. The visor body is secured to a generally L-shaped, hollow, steel visor pivot rod 16 by means of a spring clamp 18 of the type disclosed in co-pending U.S. patent application Ser. No. 392,534, filed on June 28, 1982, and entitled VISOR CONTROL, the disclosure of which is incorporated herein by reference. Clamp 18 permits the visor to move from a lowered, use position, as illustrated in FIG. 1, to a raised, stored position against the vehicle headliner which includes an upholstery material 22 which overlies the sheet metal construction of the vehicle. Visor 10 may include an illuminated vanity mirror assembly of the type disclosed in U.S. Pat. No. 4,227,241 in which case electrical wires will extend through the hollow visor rod 16 for connection between the vehicle's electrical supply system and the illumination means of the vanity mirror assembly.

The end of the L-shaped visor rod extends upwardly through the rod mounting assembly 20 of the present invention which secures the visor rod to a sheet metal frame member 19 of the vehicle. Typically, member 19 will be a part of the original vehicle and welded to the roof as a support frame near the windshield area. For purposes of mounting the visor in generally horizontally extending position with respect to the inclined frame member 19 shown in the drawings, an arcuate die cut 17 (FIG. 2) is made, and a section 15 of frame member 19 is bent upwardly into a generally horizontally extending position, as shown. Section 15 defines a mounting plate for the visor and includes a generally square aperture 13 formed therein including opposed rectangular slots 11 (FIG. 6) through opposite edges and opposed, generally rectangular slots 21 through alternate opposite edges. In some embodiments, aperture 13 may be a square, rectangle or other polygon shape which would prevent rotation of a similar shaped torque fitting when inserted through plate 15.

The mounting assembly 20 of the preferred embodiment of the invention includes a polymeric torque fitting 30 which is molded onto the short leg of the visor rod 16 spaced slightly downwardly from the outer end 24, as shown, and a locking clip 50 which extends over end 24 of the visor rod and interengages the mounting plate 15 and torque fitting 30 for locking the visor rod securely in place holding the visor in a fixed, but adjustable, position such that the visor can be moved from the front windshield area to the side window if desired and remain in the selected position.

The torque fitting 30 is molded to the visor rod end and provides a frictional interface permitting the visor rod to rotate therein with a predetermined torque of from 8 to 30 inch-lbs. which is sufficient to hold the visor in a selected, adjusted position. It has been found that acetal, and particularly an acetal homopolymer such as CELCON ®, provides the desired characteristics for this application. Other polymeric material, however, having a shrinkage of from about 0.020 to 0.025 inch per linear inch to compressibly engage the cylindrical rod 16 and which upon cooling will not set up against the rod thereby providing the desired breakaway torque could also be employed. In order to hold the torque fitting in axial alignment with respect to rod 16, the rod includes an annular depression 26 (FIGS. 4 and 5) formed therein and into which the polymeric material flows during the molding process which is conventional. The torque fitting 30 is generally cylindrical and includes a decorative bezel 32 at one end which can either be integral with the torque fitting or slide over the rod as a separate washer-like cover. Bezel 32 has opposed slots 34 (FIGS. 1 and 3) formed therein for providing access to the locking clip for the purpose described below. Bezel 32 is generally circular in configuration including a narrowed, lower portion surrounding the visor rod 16 and having a diameter at its upper portion sufficient to cover the aperture 17 formed by the deflected mounting plate 15.

Figures 3, 7:
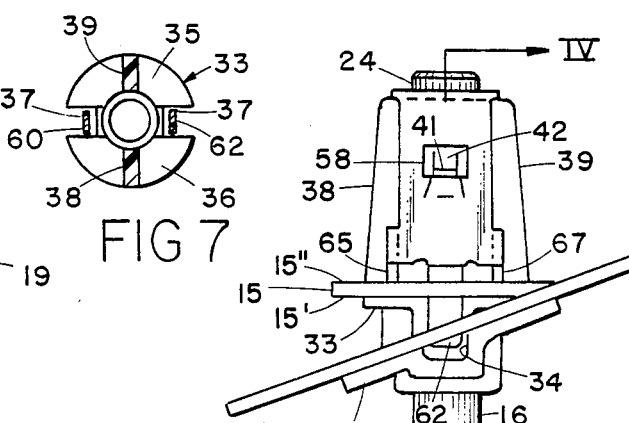
FIG. 3 is a rear elevational view of the mounting assembly shown in FIG. 1.
FIG. 7 is a cross-sectional view taken along section line VII—VII of FIG. 2.

Axially spaced upwardly from bezel 32 is a support flange means 33 which, as best seen in FIG. 7, comprises a pair of arcuate-shaped surfaces 35 and 36 separated by opposing notches 37 providing clearance for the tab extensions 60 and 62 of the locking clip 50. The diameter of flange means 33 is less than the overall diameter of aperture 17 formed in sheet metal frame 19 to permit it to pass upwardly through frame 19 and engage the lower surface 15' of mounting plate 15 surrounding the keyed aperture 13. Thus, the diameter is also slightly larger than the mean diameter of aperture 13 to contact the peripheral edges of the aperture 13 in member 15.

Figure 5:
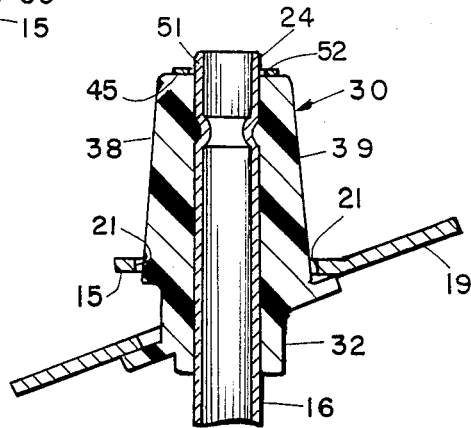
FIG. 5 is a cross-sectional view taken along section line V—V of FIG. 2.

Extending upwardly on opposite sides of the generally cylindrical torque fitting 30 are a pair of opposed, longitudinally extending indexing and reinforcing ribs 38 and 39 (FIGS. 1, 3 and 5) which extend through slots 21 in member 15. Ribs 38 and 39 are generally trapezoidal to facilitate admission of the mounting assembly through plate 15 and therefore are narrowed at the upper end and outwardly flared at their lower end, as best seen in FIGS. 3 and 5. The ribs have a generally rectangular cross section which substantially conforms to the shape of slots 21 (FIG. 6) but slightly narrower to facilitate installation of the torque fitting and attached locking clip. As seen in FIG. 5, the ribs 38 and 39 extend through plate 15 in an installed position.

Figure 4:
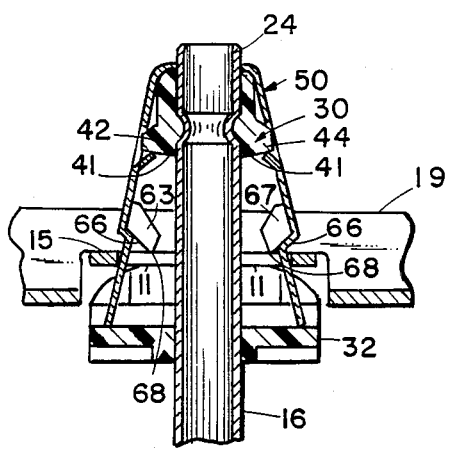
FIG. 4 is a cross-sectional view taken along section line IV—IV of FIG. 3.

The torque fitting 30 also includes a pair of opposed locking tabs 42 and 44 (FIGS. 2, 3 and 4) which are axially spaced above support disk 33 and are generally truncated, triangular in cross section, as best seen in FIG. 4. Each of the tabs 42 and 44 includes a lower surface 41 which is engaged by a locking dog 55 or 57 associated with locking clip 50 for holding the torque fitting in place with respect to clip 50, as described in greater detail below. The top 45 of torque fitting 30 is square and flat to conform to and seat with the locking clip 50, now described in detail.

Figure 2:
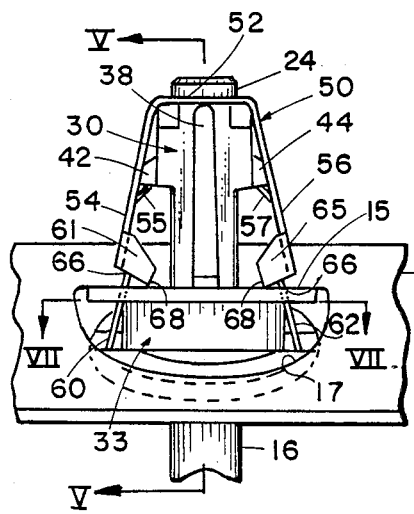
FIG. 2 is a right side elevational view of the mounting assembly shown in FIG. 1.

Locking clip 50 is made of spring steel having a thickness, in the preferred embodiment, of about 0.032 inch and tempered to a Rockwell C hardness of from 38 to 42. The steel is mechanically formed by conventional cutting and stamping processes to define a generally U-shaped structure having a horizontally extending base 52 with an aperture 51 extending therethrough for receiving the end 24 of pivot rod 16. Extending downwardly in an outwardly diverging direction is a pair of legs 54 and 56 each of substantially identical shape. The legs include inwardly projecting (at an angle of approximately 30 degrees) locking dogs 55 and 57 with the dogs having edges which engage surfaces 41 on tabs 42 and 44, respectively, as best seen in FIGS. 2 and 4. When dogs 55 and 57 are formed, sidewalls of legs 54 and 56 are relieved to define apertures 58 (FIG. 3) on each of the legs through which the outer tips of locking tabs 42 and 44 can slightly project when the structure is installed, as shown in the Figures.

Legs 54 and 56 also include centrally aligned, downwardly projecting indexing tabs 60 and 62 which project through notches 11 in plate 15 and as best seen in FIGS. 1 and 3, are narrower than the legs 54 and 56 and centrally aligned with the longitudinal axis of the legs. The tabs allow the legs of the locking clip to be compressed for ease of installation and removal, as explained below.

Figure 6:
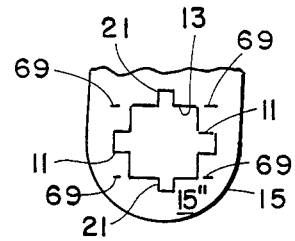
FIG. 6 is a fragmentary, top plan view of a portion of the sheet metal frame through which the mounting assembly is installed.

The four lower corners of the body portion of legs 54 and 56 each include a pair of spaced, inwardly projecting locking tips 61, 63 and 65, 67, respectively, each of which are generally trapezoidal-shaped, as best seen in FIGS. 2 and 4, with a downwardly projecting edge 66 terminating at a point 68 which engages the point areas 69 on the top surface 15" of plate 15, as illustrated in FIG. 6, and as shown also in FIGS. 2 and 4, to essentially wedge and dig into and lock the locking clip and torque fitting in position, as illustrated.

The locking clip 50 is formed such that the legs diverge outwardly at a distance slightly greater than that shown in the compressed position of FIG. 2, and installation is achieved once the molded-on torque device has been molded on the end of rod 16 by placing the clip over the molded-on torque device with tip 24 of rod 16 extending through aperture 51. The legs spread slightly until dogs 55 and 56 clear tabs 42 and 44 and then snap inwardly and engage the undersurface 41 of the tabs. The tabs 60 and 62 at the ends of clip 50 are then squeezed inwardly, and the clip and torque device inserted into the aperture 13 in plate 15 with ribs 38 and 39 extending through slots 21 and tabs 60 and 62 extending through slots 11. The device is pushed through the plate 15 until such time as the spring legs 54 and 56 resiliently snap outwardly as locking leg edges 66 and tips 68 clear the edge of aperture 13 and engage the upper surface 15" of plate 15. In this position, the supporting disk surfaces 35 and 36 securely engage the undersurface 15' of plate 15 with the pointed tips 68 of the locking legs 61, 63 and 65, 67 dig into the top surface of the plate. At the same time, dogs 55 and 57 urge the torque fitting in an upward direction. The contact of locking clip 50 between the torque fitting 30 and plate 15 thereby holds the torque fitting in tension against axial movement into and out of the plate, and the keyed aperture 13 prevents rotation of the torque fitting with respect to the plate. The structure thus securely anchors the visor assembly in an installed position. If desired, tabs 60 and 62 can be urged outwardly slightly to force the locking clip points 61 to move downwardly and wedge fitting in place with even greater pressure. If it is necessary to remove the visor assembly, once installed, a caliper-type plier tool is employed to compress tabs 60 and 62 inwardly through apertures 34 in boss 32 while urging upwardly on the visor rod 16 until the locking legs 61, 63, 65 and 67 clear surface 15'' and are aligned with the aperture 13 whereupon the visor assembly can be withdrawn downwardly from the mounting plate.

It will become apparent to those skilled in the art that various modifications to the preferred embodiment of the present invention as described herein can be made without departing from the spirit or scope of the invention as defined by the appended claims.

The embodiments of the invention in which an exclusive property or privilege is claimed are defined as follows.

1. A visor mounting assembly for mounting a vehicle visor, including a visor pivot rod, to a vehicle mounting plate with a keyed aperture, said assembly comprising:
   a visor mounting rod;
   a polymeric torque fitting molded to an end of said rod; said torque fitting including a support flange with a surface for engaging a lower side of a mounting plate in a vehicle, said torque fitting shaped to extend through an aperture in the mounting plate to prevent rotation of said torque fitting with respect to the mounting plate; and
   a locking clip for engaging an upper surface of the mounting plate and extending between the mounting plate and said torque fitting for securing said torque fitting, and said rod and visor coupled thereto, to the vehicle.

2. The apparatus as defined in claim 1 wherein said torque fitting includes a pair of opposed tabs extending outwardly from said cylindrical body and spaced axially from said support flange and wherein said locking clip engages said tabs for holding said torque fitting in place.

3. The apparatus as defined in claim 2 wherein said locking clip comprises a generally U-shaped member having a base and integral resilient legs extending from opposite edges of said base and wherein each of said legs includes a locking dog which aligns with and engages one of said tabs of said torque fitting for holding said torque fitting adjacent said base of said locking clip.

4. The apparatus as defined in claim 3 wherein said torque fitting is molded on said visor rod in spaced relationship to the rod such that an exposed end of said rod extends beyond said torque fitting, and wherein said base of said locking clip includes an aperture for receiving said exposed end of said rod.

5. The apparatus as defined in claim 4 wherein each of said resilient legs of said locking clip includes a pair of spaced locking legs each having a pointed end which engages the upper surface of the mounting plate in a wedging fashion upon movement of said resilient legs of said clips.

6. The apparatus as defined in claim 5 wherein said resilient legs of said locking clip further include tabs which extend beyond said locking legs to depend below the mounting plate when installed.

7. The apparatus as defined in claim 6 wherein said torque fitting includes at least one longitudinally extending rib extending outwardly from said body.

8. The apparatus as defined in claim 2 wherein said locking clip comprises a generally U-shaped member having a base and integral resilient legs extending from opposite edges of said base and wherein each of said legs includes a pair of spaced locking legs each having a pointed end which engages the upper surface of the mounting plate in a wedging fashion upon movement of said resilient legs of said clip.

9. The apparatus as defined in claim 8 wherein said torque fitting is molded on said visor rod in spaced relationship to the rod such that an exposed end of said rod extends beyond said torque fitting, and wherein said base of said locking clip includes an aperture for receiving said exposed end of said rod.

10. The apparatus as defined in claim 9 wherein said resilient legs of said locking clip further include tabs which extend beyond said locking legs to depend below the mounting plate when installed.

11. An automotive visor comprising:
    a visor rod;
    a visor body rotatably mounted to said visor rod for movement between a raised stored position and a lowered use position;
    cylindrical means extending from an end of said visor rod into a roof mounting bracket associated with a vehicle, the bracket having a polygonal aperture for mounting said visor body to the vehicle;
    a torque fitting mounted to said cylindrical means such that it can rotate therearound with a predetermined torque, said torque fitting including means for engaging the aperture for holding said torque fitting against rotation with respect to the vehicle upon installation of said visor, said torque fitting including means for engaging one side of the roof mounting bracket; and
    a locking clip having edge means for engaging an opposite side of the mounting plate and including means for securely attaching said locking clip to said torque fitting placing the torque fitting under a holding force with respect to the mounting bracket.

12. The apparatus as defined in claim 11 wherein said visor rod is L-shaped and wherein said cylindrical means comprises one leg of said L-shaped visor rod.

13. The apparatus as defined in claim 12 wherein said torque fitting is made of a polymeric material molded onto said one leg of said L-shaped visor rod.

14. The apparatus as defined in claim 13 wherein said means for engaging one side of the roof mounting bracket comprises a support flange integrally molded on said torque fitting.

15. The apparatus as defined in claim 14 wherein said torque fitting includes a pair of opposed tabs extending outwardly from said cylindrical body and spaced axially from said support flange and wherein said locking clip engages said tabs for holding said torque fitting in place.

16. The apparatus as defined in claim 15 wherein said locking clip comprises a generally U-shaped member having a base and integral resilient legs extending from opposite edges of said base and wherein each of said legs includes a locking dog which aligns with and engages one of said tabs of said torque fitting for holding said torque fitting adjacent said base of said locking clip.

17. The apparatus as defined in claim 16 wherein said torque fitting is molded on said visor rod in spaced relationship to the rod such that an exposed end of said rod extends beyond said torque fitting, and wherein said base of said locking clip includes an aperture for receiving said exposed end of said rod.

18. The apparatus as defined in claim 17 wherein each of said resilient legs of said locking clip includes a pair of said spaced locking legs and wherein said edge means comprises a pointed end of each of said locking legs which engages the upper surface of the mounting plate in a wedging fashion upon movement of said resilient legs of said clips.

19. The apparatus as defined in claim 18 wherein said resilient legs of said locking clip further include tabs which extend beyond said locking legs to depend below the mounting plate when installed.

20. The apparatus as defined in claim 19 wherein said means engaging the aperture comprises a rib extending longitudinally and outwardly from said torque fitting.

21. A visor mounting assembly for a vehicle visor comprising:
- a visor mounting bracket for attachment to the roof of a vehicle for positioning a visor therein, said bracket including a mounting plate having a polygonal aperture formed therein;
- a visor pivot rod for locking a visor for movement between a lowered use position and a raised stored position and for movement from a front position adjacent the windshield of a vehicle to a side position adjacent a side window of a vehicle;
- a polymeric torque fitting molded to an end of said visor pivot rod; said torque fitting including a support flange with a surface for engaging a lower side of a mounting plate in a vehicle, said torque fitting body shaped to extend through said aperture in said mounting plate to prevent rotation of said torque fitting with respect to said mounting plate; and
- a locking clip engaging an upper surface of the mounting plate and said torque fitting for securing said torque fitting and the visor rod and visor coupled thereto to said vehicle.

* * * * *

UNITED STATES PATENT AND TRADEMARK OFFICE
CERTIFICATE OF CORRECTION

PATENT NO. : 4,569,552
DATED : February 11, 1986
INVENTOR(S) : Larry Marks

It is certified that error appears in the above–identified patent and that said Letters Patent are hereby corrected as shown below:

Column 5, claim 1, line 35:

after "fitting" insert --body--.

Signed and Sealed this

Thirtieth Day of September 1986

[SEAL]

Attest:

DONALD J. QUIGG

Attesting Officer

Commissioner of Patents and Trademarks